(12) United States Patent
Vetterli et al.

(10) Patent No.: US 10,182,679 B2
(45) Date of Patent: Jan. 22, 2019

(54) CLEANING SYSTEM FOR AN APPARATUS FOR DISPENSING LIQUID FOODSTUFFS

(71) Applicant: Franke Kaffeemaschinen AG, Aarburg (CH)

(72) Inventors: Heinz Vetterli, Wangen (CH); Mariano Turi, Zurich (CH)

(73) Assignee: FRANKE Kaffeemaschinen AG, Aarburg (CH)

( * ) Notice: Subject to any disclaimer, the term of this patent is extended or adjusted under 35 U.S.C. 154(b) by 0 days.

(21) Appl. No.: 15/760,873

(22) PCT Filed: Sep. 15, 2016

(86) PCT No.: PCT/EP2016/071798
§ 371 (c)(1),
(2) Date: Mar. 16, 2018

(87) PCT Pub. No.: WO2017/046230
PCT Pub. Date: Mar. 23, 2017

(65) Prior Publication Data
US 2018/0255964 A1    Sep. 13, 2018

(30) Foreign Application Priority Data
Sep. 18, 2015    (DE) .................. 10 2015 217 964

(51) Int. Cl.
*A47J 31/60* (2006.01)
*B08B 9/032* (2006.01)
*B08B 3/08* (2006.01)

(52) U.S. Cl.
CPC .............. *A47J 31/60* (2013.01); *B08B 9/032* (2013.01); *B08B 9/0325* (2013.01); *B08B 3/08* (2013.01); *B08B 2209/032* (2013.01)

(58) Field of Classification Search
CPC ........ A47J 31/60; B08B 9/032; B08B 9/0325; B08B 3/08; B08B 2209/032
USPC ........................................... 222/148
See application file for complete search history.

(56) References Cited

U.S. PATENT DOCUMENTS

| 8,770,099 B2 | 7/2014 | Reyhanloo |
| 2009/0183754 A1 | 7/2009 | Vetterli et al. |
| 2011/0005407 A1 | 1/2011 | Reyhanloo |
| 2014/0060338 A1* | 3/2014 | Tembaak ............. A47J 31/60 137/268 |

(Continued)

FOREIGN PATENT DOCUMENTS

| DE | 102008003733 | 7/2009 |
| DE | 102013105402 | 12/2014 |
| DE | 102014215689 | 2/2016 |

(Continued)

*Primary Examiner* — Tuan N Nguyen
(74) *Attorney, Agent, or Firm* — Volpe and Koenig, P.C.

(57) ABSTRACT

In order to specify, in the case of an apparatus for dispensing liquid foodstuffs, in particular milk products, an integrated cleaning system which is straightforward and reliable to handle, provision is made for a foodstuff-supply line to be provided with a connection, on which can be fitted an intake line which leads to a storage tank containing the liquid foodstuff, and for a connecting element to be provided, it being possible for this connecting element, when the intake line has been removed, to be fitted onto the connection in order for the foodstuff-supply line to be connected fluidically to the integrated cleaning system.

10 Claims, 4 Drawing Sheets

(56) References Cited

U.S. PATENT DOCUMENTS

2015/0245736 A1 9/2015 Reyhanloo
2017/0208990 A1 7/2017 Turi et al.

FOREIGN PATENT DOCUMENTS

| EP | 2272408 | 1/2011 |
| EP | 2272409 | 1/2011 |
| EP | 2474254 | 7/2012 |
| EP | 2702908 | 3/2014 |
| EP | 2807964 | 12/2014 |

\* cited by examiner

CLEANING SYSTEM FOR AN APPARATUS FOR DISPENSING LIQUID FOODSTUFFS

BACKGROUND

The present invention relates to an apparatus for dispensing liquid foodstuffs, in particular milk products, with an integrated cleaning system comprising a cleaning container which is provided for a flushing solution and which, for the purpose of carrying out a cleaning process, is connectable to a foodstuff supply conduit of the apparatus.

When dispensing liquid foodstuffs, for example in the form of hot or cold drinks, the liquid foodstuff is often processed in the dispensing apparatus, for example by heating, cooling, mixing of different foodstuff constituents, frothing or the like. The component parts and conduit systems in the interior of the beverage dispenser coming into contact with the liquid foodstuff have to be cleaned at regular intervals for reasons of hygiene. This is generally done using a cleaning system which flushes the relevant component parts and conduits systems with a flushing solution. Depending on the type of foodstuff, special detergents have to be used to eliminate the foodstuff residues.

For practical reasons, the detergent is often made available as a concentrate from which the flushing solution is prepared by mixing with water in the flushing system. For this purpose, the cleaning system can in particular comprise a detergent pump, which is provided to convey the detergent from a detergent container into a mixing chamber or a cleaning container in which the flushing solution is mixed. DE 10 2008 903 733 describes a cleaning module for machines for producing liquid foodstuffs, in particular for automatic coffee machines. The cleaning module comprises at least one detergent container, a metering pump for conveying the detergent, and a mixing container for preparing a flushing solution from supply water and detergent. The cleaning module is connected in place of a foodstuff container to the coffee machine in order to carry out a cleaning process.

DE 10 2014 215 689, which is not a prior publication, discloses a beverage dispenser with a cleaning system in which a detergent container and an associated detergent pump are integrated in the beverage dispenser. When a foodstuff container is replaced by a detergent mixing container, the beverage dispenser detects this automatically and a cleaning process can be started.

EP 2 272 409 A1 discloses a frothing device in which milk is sucked through a venturi nozzle and frothed with steam. In order to clean the frothing chamber, the milk conduit can be connected, by a switching valve, to a hot water conduit or steam conduit in order to flush hot water through the frothing chamber.

DE 10 2013 105 402 discloses a device for generating milk foam, which device likewise has a frothing chamber with a venturi nozzle. For flushing, the milk suction hose can be removed and, by means of a pivotable adapter, the suction conduit can be connected to a parallel flushing conduit. By way of the flushing conduit, hot water or steam can be delivered at external pressure to the milk system for cleaning purposes.

Since the cleaning has to be carried out at least daily, sometimes also several times a day, it is important that the cleaning system is easy to handle and the cleaning process is easy to carry out. On the other hand, during handling of the cleaning system, it is necessary to ensure that the liquid foodstuff and a flushing solution used for cleaning do not come into contact or mix together.

SUMMARY

An object of the invention is to make available a cleaning system that is easy and safe to handle. In particular, the cleaning system is intended to be integrated, i.e. is intended to have no parts that need to be separately handled or stored such as external cleaning modules or detergent mixing containers.

This object is achieved by an apparatus having one or more features of the invention. Advantageous embodiments are set forth below and in the claims.

In an apparatus of the type mentioned at the outset, the object is achieved, according to the invention, by the fact that the foodstuff supply conduit is provided with an attachment that serves to attach a suction conduit leading to a storage container with the liquid foodstuff, that the apparatus comprises at least one pump for conveying the liquid foodstuff out of the storage container via the foodstuff supply conduit, that a connection element is provided which, when the suction conduit is removed, can be plugged onto the attachment in order to fluidically connect the foodstuff supply conduit to the integrated cleaning system, and that the apparatus is designed to convey flushing solution from the cleaning container by means of the pump.

Thus, in order to carry out a cleaning process, the suction hose leading to the storage container with the liquid foodstuff simply has to be pulled from the attachment and the connection element plugged onto the attachment. In this way, flushing solution from the cleaning container can then be delivered to the foodstuff conduit in order to flush the latter. This is effected by the same pump with which the foodstuff is also delivered during operation, i.e. by means of the milk pump in the case of a milk system. In this way, the pump is on the one hand also flushed by the flushing solution and thus cleaned. On the other hand, the cleaning system does not have to be equipped with a separate pressure generator or similar device, since the flushing solution is not delivered at external pressure. Moreover, the plug connection to the connection element can be made much easier and more operationally secure, since it does not have to be pressure-tight, and instead only a suctioning of the flushing solution has to be ensured.

The removed suction hose is cleaned conventionally, for example by placing it in a cleaning bath. The cleaning system itself is rigidly integrated in the apparatus, such that the cleaning process itself can be carried out efficiently and quickly. After the connection element has been plugged on, the cleaning process is carried out preferably in an automated manner by a suitably configured control system of the apparatus. Since only the suction hose and the connection element have to be re-plugged for the cleaning, it is possible to safely ensure that the liquid foodstuff does not come into contact with the flushing solution.

The integrated cleaning system of the present invention can in particular have a receiving space for a detergent container and a metering pump for metered delivery of detergent from the detergent container into the cleaning container. In the cleaning container, the flushing solution is mixed from detergent and water, preferably warm water. The detergent is thus made available as a concentrate, such that the supply present in the detergent container is sufficient for a large number of cleaning processes. The detergent container thus remains in its separate receiving space and only has to be renewed or filled after all of the detergent has been used up.

The attachment is expediently configured as a plug-in nipple, and the suction conduit is designed as a suction hose with a hose coupling that can be plugged onto the plug-in nipple. This ensures straightforward and safe handling.

In an advantageous embodiment, the attachment is assigned a sensor which detects a plugged-on state of the connection element and sends a control signal to a control system of the apparatus, on the basis of which signal the cleaning process can be activated or is automatically activated. This ensures that a cleaning process can be carried out only when the connection element is correctly plugged on. By contrast, if the suction conduit leading to the storage container is plugged onto the attachment, the control system suppresses the implementation of a cleaning process. Conversely, dispensing of liquid foodstuff can be suppressed if the sensor detects a plugged-on state of the connection element. This ensures that flushing solution is not inadvertently dispensed and erroneously held for foodstuff. In addition or alternatively, sensor-supported detection of a plugged-on state of the suction hose can also be provided.

In a preferred embodiment, the sensor is designed as a reed contact, and a magnet for triggering the reed contact is arranged on the connection element. Such a sensor reliably permits safe detection of whether the connection element of the suction conduit is plugged onto the attachment.

In a particularly preferred embodiment of the invention, the connection element is movably connected to the apparatus and, when the suction conduit is removed, can be moved from an inactive position to a cleaning position in which it connects the foodstuff supply conduit to the integrated cleaning system. Since the connection element is provided and mounted on the apparatus itself, it does not have to be handled and stored as a separate component, such that it can be set to use quickly and easily for carrying out a cleaning process.

For example, the connection element can be arranged on a bracket of the apparatus and is mounted so as to be rotatable about an axis with respect to the bracket and to be axially displaceable by a predetermined displacement path. In order to carry out a cleaning process, the connection element is moved from the inactive position to the cleaning position, in which it can be plugged onto the attachment designed as a plug-in nipple.

The connection element can be designed in particular as a rigid connection part which, in the form of a jumper, can be plugged onto the attachment designed as plug-in nipple and onto a further plug-in nipple leading to the cleaning container. Such a jumper is easy to handle and safe to operate. If plug-in nipples of different shape and/or size are used for cleaning system and foodstuff supply conduit, it is possible to rule out the possibility of the suction conduit being inadvertently plugged onto the further plug-in nipple leading to the cleaning container.

A rigid connection part of this kind in the form of a jumper can in particular be arranged on an operating lever which is mounted so as to be rotatable about an axis with respect to the bracket and to be axially displaceable by a predetermined displacement path. By use of the operating lever, the connection part can be moved from an inactive position to a cleaning position, in which it connects the two plug-in nipples. The operating lever can serve at the same time as an electric switch or contact, such that the position of the connection part is detected via the switch setting and is automatically switched from a cleaning mode to a foodstuff dispensing mode or vice versa or an activation of the cleaning mode can at least be enabled.

In particular, at least one blind nipple onto which the connection part can be plugged in an inactive position can be arranged on the bracket. Thus, the connection element, even in the inactive position, is located in a defined position and securely held.

BRIEF DESCRIPTION OF THE DRAWINGS

Further preferred features and embodiments are explained below on the basis of illustrative embodiments and with reference to the figures, in which.

DETAILED DESCRIPTION OF THE PREFERRED EMBODIMENTS

Figure 1:
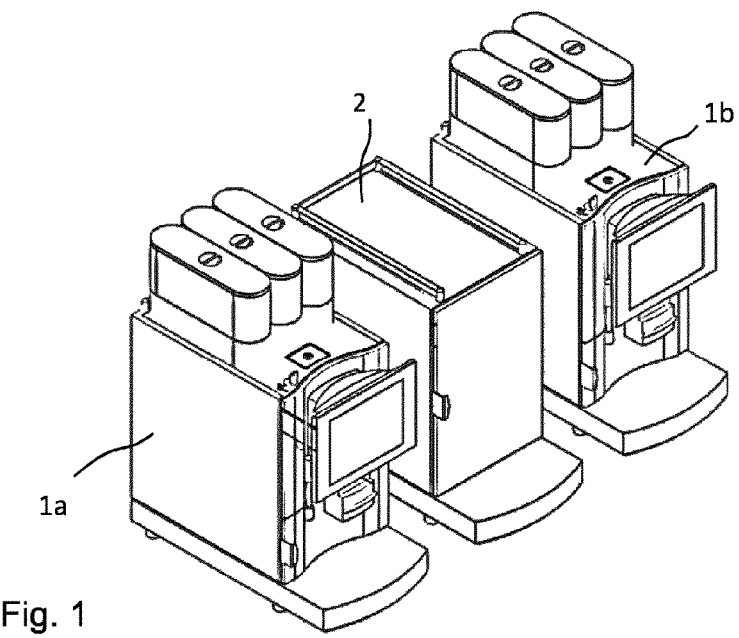
FIG. 1 shows two automatic coffee machines with a common supply unit for milk products.

FIG. 1 shows the example of two automatic coffee machines 1a, 1b and, placed between them, a third unit 2 in the form of an auxiliary appliance. The auxiliary appliance 2 is a cooling unit which serves to store cooled milk for the preparation of coffee or milk drinks with warm or cold milk or milk foam. For this purpose, the cooling unit 2 contains a corresponding dispensing device for milk products. The auxiliary appliance is installed centrally between two coffee machines. Alternatively, the cooling unit can of course also be designed as a below-counter appliance. It is likewise possible to integrate the cooling unit and associated dispensing device for milk products in an automatic coffee machine.

The cooling unit 2 is controlled electronically and cooperates with the control system of the two automatic coffee machines 1a, 1b. For example, an indication of the temperature in the cooling unit is indicated via the display of the automatic coffee machines 1a, 1b. Similarly, the empty message, the product stoppage in the absence of milk, and a residual amount of milk/milk coffee products after the empty message can be programmed on the attached coffee machines 1a, 1b.

The auxiliary appliance 2 has an integrated cleaning system with which automatic flushing and cleaning programs can be executed by auxiliary appliance 2 and coffee machines 1a, 1b. For this purpose, the internal and external milk conduits of the coffee machines 1a, 1b and of the auxiliary appliance 2 are flushed with a flushing solution in order to remove milk residues.

Figure 2:
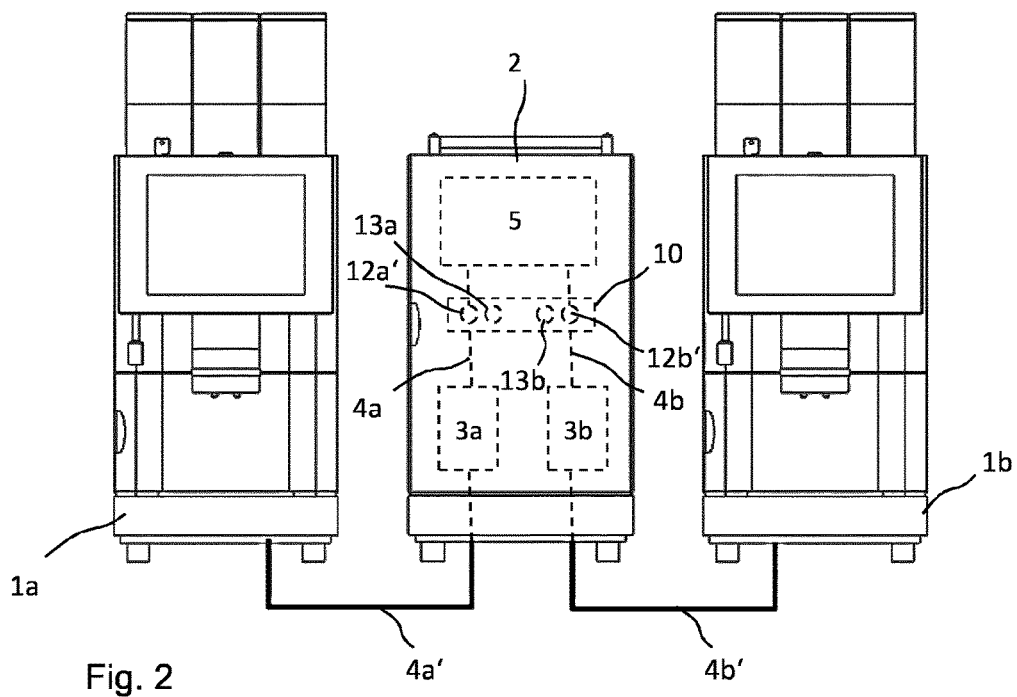
FIG. 2 shows a plan view of the automatic coffee machines and supply unit from FIG. 1, with schematically indicated milk conduits.

FIG. 2 shows a view of the automatic coffee machines 1a, 1b and of the auxiliary appliance, with a schematic block diagram of the milk dispenser contained in the auxiliary appliance 2. The auxiliary appliance 2 contains two high-performance milk pumps 3a, 3b, with which milk from a milk container 5 can be conveyed through corresponding milk conduits 4a, 4b, 4a', 4b' to the two automatic coffee machines 1a, 1b. At an attachment bracket 10, a suction hose 12a, 12b leading to the milk container is in each case connected to the milk conduit 4a, 4b. For this purpose, corresponding plug-in nipples 12a', 12b' are provided for plugging on the suction hoses 12a, 12b. The milk conduits 4a, 4b lead from the attachment bracket 10 to the two milk pumps 3a, 3b and from there, as external conduits 4a', 4b', onward to the two automatic coffee machines 1a, 1b.

Alongside each of the plug-in nipples 12a', 12b' leading to the milk conduits 4a, 4b, a respective second plug-in nipple 13a, 13b is arranged which leads to the integrated cleaning system described in detail below. When the suction hose 12a, 12b is removed, the plug-in nipples 12a', 13a and 12b', 13b, respectively, arranged alongside each other can be connected by way of an associated cleaning adapter, and therefore the cleaning system can be connected to the respective milk conduit 4a, 4b.

Figure 3:
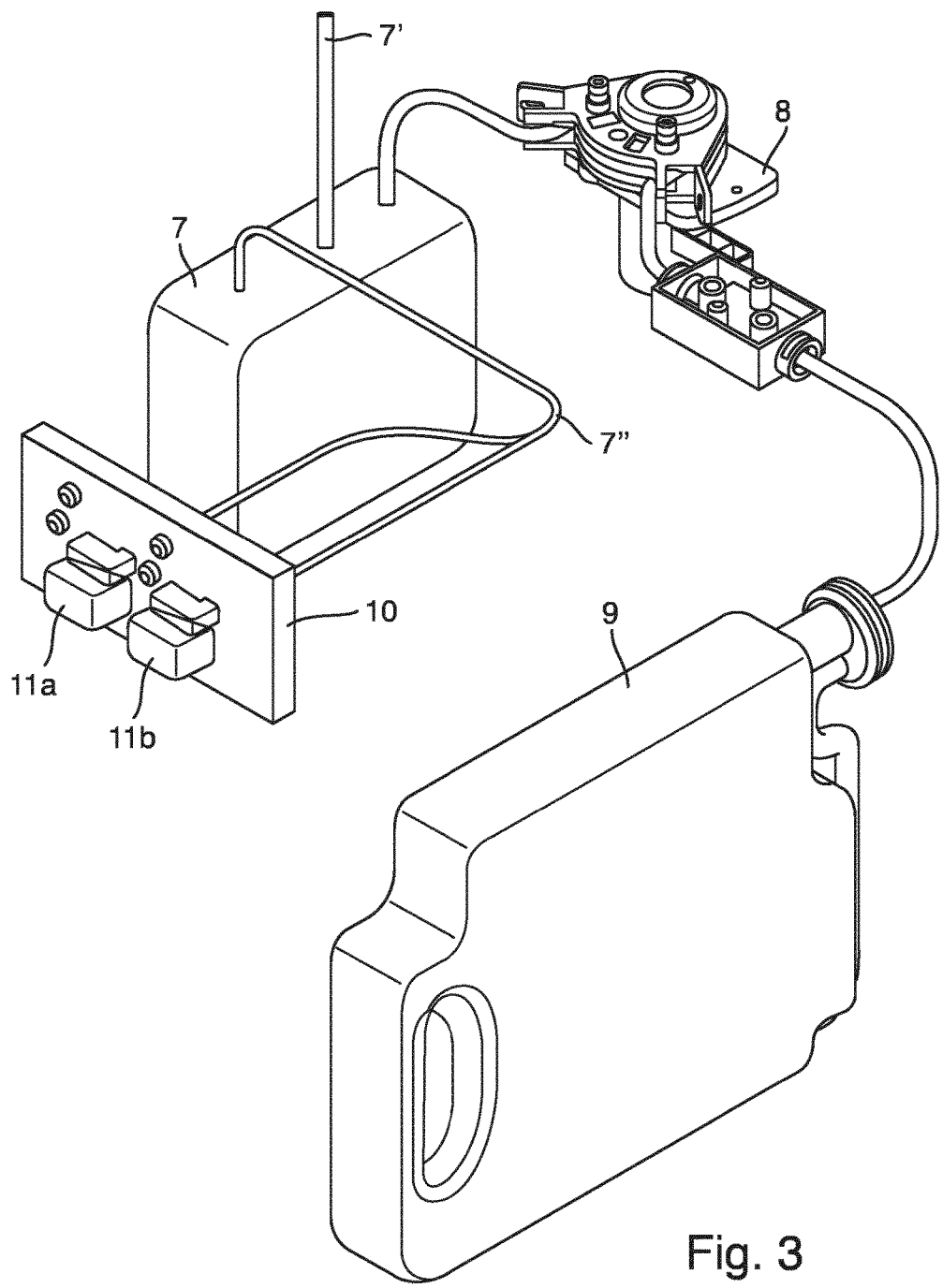
FIG. 3 shows a cleaning system integrated in the supply unit, with metering pump, cleaning container, and operating bracket.

The components of the cleaning system integrated in the auxiliary appliance 2 are shown schematically in FIG. 3. The cleaning system comprises a cleaning container 7, a detergent pump 8 and a detergent container 9. The detergent pump 8 delivers detergent in metered amounts from the detergent container 9 into the cleansing container 7. There, a flushing solution is mixed from the detergent by addition of water via a corresponding water supply line 7'. From the cleaning container 7, a branch conduit 7" leads to an attachment bracket 10, at which the integrated cleaning system can be connected to the milk pumps 3a, 3b. The connection is effected manually with the aid of connection elements 11 in the form of rigid adapters or jumpers which are plugged onto corresponding hose attachments, which lead on the one hand to the relevant milk pump 3a, 3b and on the other hand to the cleaning container 7.

The detergent container 9 is designed as a disposable article and is filled with a detergent at the works. In the illustrative embodiment, the detergent is a milk cleaner and serves to clean the milk foam system M1, M2 of attached milk residues, in particular proteins. To carry out a cleaning process, the integrated milk foam system of the automatic coffee machines 1a, 1b, in particular the milk pumps 3a, 3b, the milk conduits and optional continuous-flow heaters and frothing chambers, are flushed with the flushing solution all the way to the outlet for milk or milk foam. This is followed by secondary flushing with clean water and/or steam.

Figure 4:
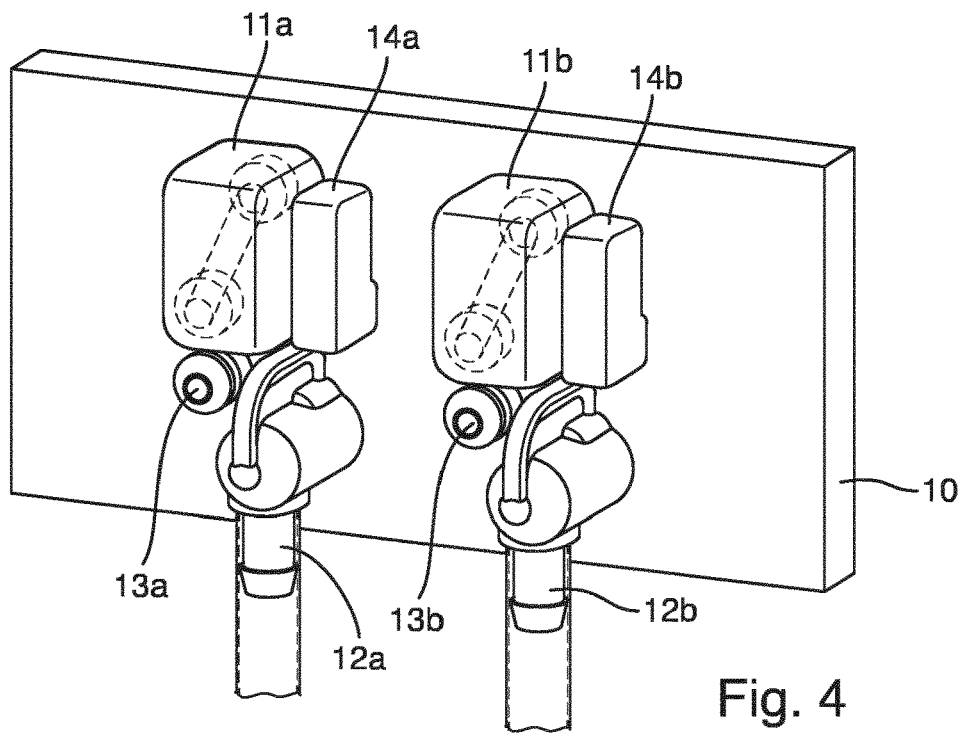
FIG. 4 shows the operating bracket from FIG. 3, with milk attachment conduits plugged on, FIG. 5 shows the operating bracket from FIG. 4, with a cleaning adapter located in a cleaning position.

FIG. 4 shows an enlarged view of the attachment bracket 10. From the direction of the front, two suction hoses 12a, 12b are plugged by hose couplings onto corresponding plug-in nipples 12a', 12b', which lead in each case via a milk conduit (4a, 4b in FIG. 2) to the two milk pumps 3a, 3b. The connection elements 11a, 11b designed as plug adapters are located in an inactive position and are plugged for storage onto two respective blind nipples 16a, 17a, 16b, 17b. The suction conduits 12a, 12b lead to the milk container 5 and can be removed in order to clean them separately. In the position shown in FIG. 4, with the suction conduits 12a, 12b plugged on, milk can be suctioned out of the milk container 5 via the milk pumps 3a, 3b.

Located alongside each of the plug-in nipples 12a', 12b' with the plugged-on attachment conduits 12a, 12b there is in each case a second plug-in nipple 13a, 13b which leads via the conduit 7" to the cleaning container 7. When one of the suction hoses 12a is removed, the relevant adapter 11a can be pulled from its inactive position from the blind nipples 16a, 17a and plugged in the manner of a bridge over the two plug-in nipples 13a, 12a' in order thereby to connect the cleaning system to the respective milk pump 3a, 3b via the relevant milk conduit 4a. For the left-hand milk system M1, this position is shown in FIG. 5.

The two cleaning adapters 11a, 11b are each arranged rigidly on a toggle-shaped operating lever 14a, 14b and connected thereto. The operating levers 14a, 14b can be pulled out, together with their associated cleaning adapter 11a, 11b, by approximately the length of the plug-in nipples 13a, 12a', 13b, 12b' and blind nipples 16a, 17a, 16b, 17b perpendicular to the attachment bracket 10 and are then pivoted about a pivot axis until the cleaning adapters 11a, 11b are positioned over the two associated plug-in nipples 13a, 12a', 13b, 12b' and can be plugged onto these. The operating levers 14a, 14b additionally actuate an electric switch or contact which is located behind the attachment bracket 10 and which sends a signal to the control system of the auxiliary appliance 2 or of the automatic coffee machines 1a, 1b, such that the control system knows the position of the cleaning adapters 11a, 11b. Alternatively, it is also possible for sensors, for example reed sensors, to be arranged behind the attachment bracket 10, with which sensors the position of the cleaning adapters 11a, 11b can be detected.

Figure 5:
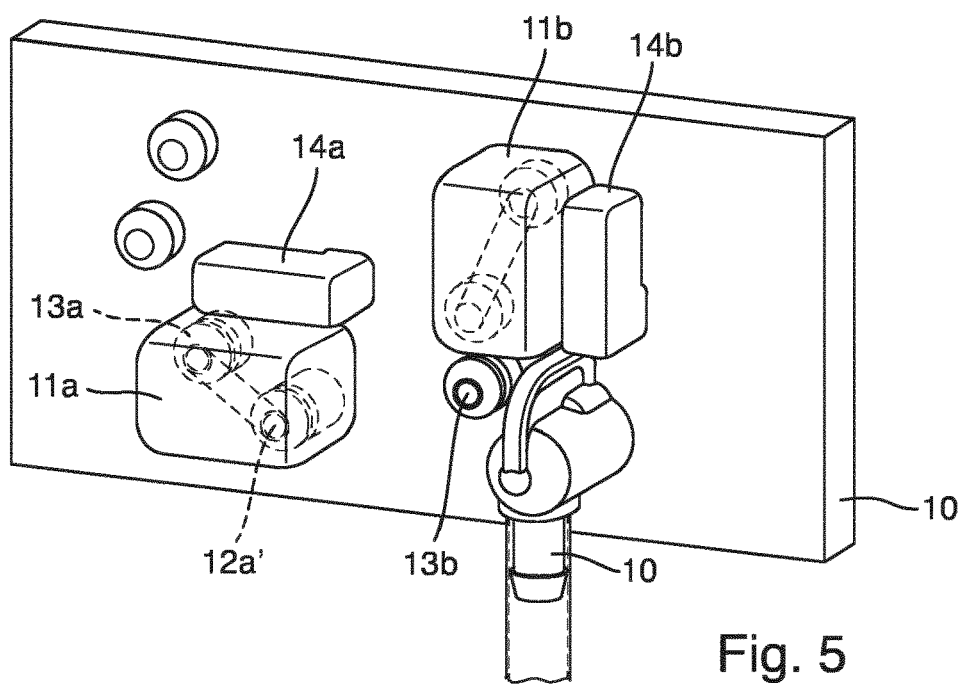

When the cleaning adapter 11a is plugged onto the adjacent hose attachments 12a', 13a, as shown in FIG. 5, this state is signalled, as has been described, to the control system, which then either switches to a cleaning mode in which either a cleaning process can be started per menu control or in which alternatively the cleaning process is started automatically. In order to clean the relevant milk system, including all of the components coming into contact with milk in the auxiliary unit 2 and associated automatic coffee machine 1a, flushing solution from the integrated cleaning container 7 is conveyed via the milk pump 3a, and the milk system is thus cleaned. After completion of the flushing process, secondary flushing is carried out with fresh water. The cleaning adapter 11a can then be pulled off again and pivoted back to the inactive position shown in FIG. 4, and the suction hose 12a leading to the milk container 5 can be plugged onto the plug-in nipple 12a'. The milk system M1 is now once again ready to dispense milk products.

Figure 6:
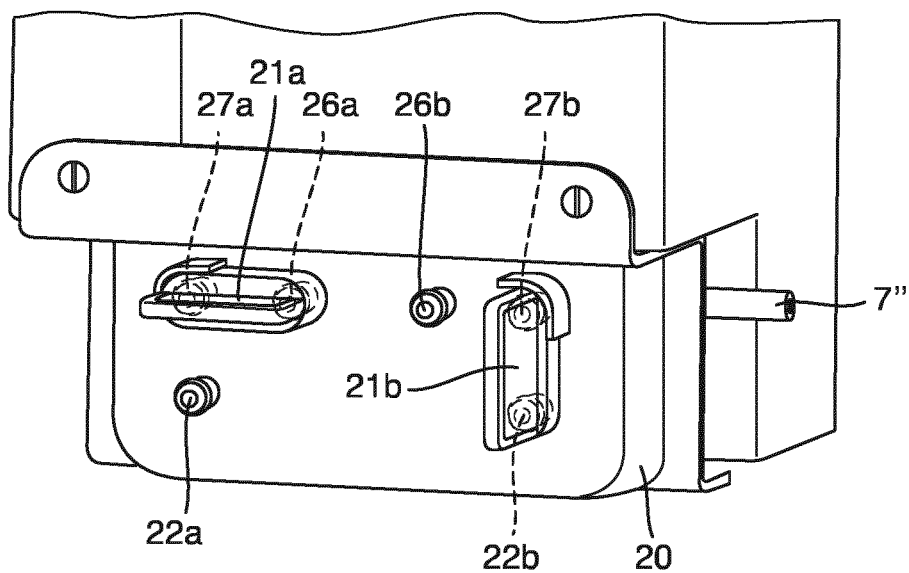
FIG. 6 shows an alternative illustrative embodiment for a cleaning adapter arranged pivotably on an operating bracket.

FIG. 6 shows an alternative illustrative embodiment for a cleaning adapter. As in the preceding illustrative embodiment, attachments 22a, 22b are provided for two milk systems. In the state ready for operation, a suction hose to a storage tank for milk (not shown) is plugged onto these. Two cleaning adapters 21a, 21b serve to connect the respective attachment 22a, 22b to the integrated cleaning system. For this purpose, the cleaning adapters are each pivotable about an axis 27, 27b and can be pulled out in the axial direction. In the state ready for operation, i.e. in an inactive position in respect of the cleaning system, the cleaning adapters 21a, 21b are plugged onto the respective blind nipples 26a, 26b. To move them to a cleaning position in which they connect the integrated cleaning system to the milk system of the automatic coffee machine, the cleaning adapters 21a, 21b are pulled out a distance, then pivoted through 90° to a position over the respectively associated attachment nipple 22a, 22b, specifically the left-hand cleaning adapter 21a clockwise and the right-hand cleaning adapter 21b counter-clockwise, and then, by pushing the adapter 22a, 22b in the direction of the operating bracket 20, they are plugged onto the associated attachment nipple 22a, 22b.

FIG. 6 shows the left-hand cleaning adapter 21a in the inactive position, i.e. in the state ready for operation of the milk system, and the right-hand cleaning adapter 21b in the cleaning position. The position of the cleaning adapters 21a, 21b is in this case detected by reed sensors arranged behind the operating bracket and magnets located in the cleaning adapters.

In this illustrative embodiment, the conduit 7" for cleaning solution from the cleaning system runs behind the operating bracket 20 and from there through the axis 27a, 27b of the respective cleaning adapter 21a, 21b, such that, for each milk system, only one attachment nipple 22a, 22b for the respective milk suction hose and one blind nipple 26a, 26b is needed on the front face of the operating bracket 20.

In addition to its use for cleaning an integrated milk system of an automatic coffee machine, the above-described cleaning system can also be used in many other devices which dispense liquid foodstuffs and which, for reasons of hygiene, required automated cleaning processes to be carried out.

The invention claimed is:

1. An apparatus for dispensing liquid foodstuffs, comprising: an integrated cleaning system (7, 8, 9) including a cleaning container (7) which is adapted to hold a flushing solution and which, for carrying out a cleaning process, is connectable to a foodstuff supply conduit (4a, 4b), the foodstuff supply conduit (4a, 4b) including an attachment (12a', 12b') that is attachable to and removable from a suction conduit (12a, 12b) leading to a storage container (5) with the liquid foodstuffs, at least one pump (3a, 3b) for conveying the liquid foodstuffs out of the storage container (5) via the foodstuff supply conduit, and a connection element (11a, 11b) which, when the suction conduit (12a, 12b) is removed, is pluggable onto the attachment (12a', 12b') to fluidically connect the foodstuff supply conduit (4a, 4b) to the integrated cleaning system (7, 8, 9) in order to convey flushing solution from the cleaning container (7) via the pump (3a, 3b).

2. The apparatus as claimed in claim 1, wherein the integrated cleaning system further comprises a receiving space for a detergent container (9) and a metering pump (8) for metered delivery of detergent from the detergent container (9) into the cleaning container (7), and the flushing solution is adapted to be mixed from detergent and water.

3. The apparatus as claimed in claim 1, wherein the attachment (12a', 12b') is a plug-in nipple, and the suction conduit (12a, 12b) is a suction hose with a hose coupling that is pluggable onto the plug-in nipple (12a', 12b').

4. The apparatus as claimed in claim 1, further comprising a control system, wherein the attachment (12a', 12b') is assigned a sensor which detects a plugged-on state of at least one of the connection element (11a, 11b) or of the suction hose (12a, 12b) and sends a control signal to the control system of the apparatus which, on the basis of said signal, is adapted to activate the cleaning process.

5. The apparatus as claimed in claim 4, wherein the sensor is a reed contact, and the apparatus further comprising a magnet for triggering the reed contact arranged on the connection element (11a, 11b).

6. The apparatus as claimed in claim 1, wherein the connection element (11a, 11b) is movably connected to the apparatus (2) and, when the suction conduit (12a, 12b) is removed, is movable from an inactive position to a cleaning position in which the connection element connects the foodstuff supply conduit (4a, 4b) to the integrated cleaning system (7, 8, 9).

7. The apparatus as claimed in claim 6, further comprising a bracket, the connection element (11a, 11b) being arranged on the bracket (10) and being rotatably mounted for rotation about an axis with respect to the bracket (10) and being axially displaceable by a predetermined displacement path in order to move the connection element (11a, 11b) from an inactive position to the cleaning position, in which the connection element is plugged onto the attachment (12a', 12b') which is formed as a plug-in nipple.

8. The apparatus as claimed in claim 7, wherein the connection element (11a, 11b) is a rigid connection part which forms a jumper that is pluggable onto the attachment (12a', 12b') formed as the plug-in nipple and onto a further plug-in nipple (13a, 13b) leading to the cleaning container (7).

9. The apparatus as claimed in claim 6, further comprising a bracket, the plug-in nipple (12a', 12b', 13a, 13b) is mounted on the bracket (10), and the connection part (112a, 11b) is arranged on an operating lever which is rotatably mounted for rotation about an axis with respect to the bracket (10) and to be axially displaceable by a predetermined displacement path in order to move the connection part (11a, 11b) from an inactive position to a cleaning position, in which the connection element, formed as a rigid connection part which forms a jumper that is pluggable onto the attachment formed as plug-in nipple (12a', 12b') and onto a further plug-in nipple (13a, 13b) leading to the cleaning container (7), connects the two plug-in nipples (12a', 12b', 13a, 13b).

10. The apparatus as claimed in claim 1, wherein the attachment (12a', 12b') is a plug-in nipple, and the connection element (11a, 11b), in an inactive position, is pluggable onto at least one blind nipple (16a, 17a, 16b, 17b; 27).

* * * * *